United States Patent
Nguyen Phuoc et al.

(10) Patent No.: US 7,218,074 B2
(45) Date of Patent: May 15, 2007

(54) METHOD AND SYSTEM FOR LIMITING THE CURRENT OUTPUT BY A SPEED CONTROLLER OPERATING ACCORDING TO A U/F CONTROL LAW

(75) Inventors: Ving Tung Nguyen Phuoc, Boulogne Billancourt (FR); Fabrice Jadot, Pacy sur Eure (FR)

(73) Assignee: Schneider Toshiba Inverter Europe SAS, Pacy sur Eure (FR)

(*) Notice: Subject to any disclaimer, the term of this patent is extended or adjusted under 35 U.S.C. 154(b) by 120 days.

(21) Appl. No.: 11/339,478

(22) Filed: Jan. 26, 2006

(65) Prior Publication Data

US 2006/0186851 A1    Aug. 24, 2006

(30) Foreign Application Priority Data

Jan. 27, 2005   (FR) .................................. 05 50238

(51) Int. Cl.
*G05B 11/36* (2006.01)

(52) U.S. Cl. ........................ 318/609; 318/610; 318/811; 318/599; 318/432

(58) Field of Classification Search ................ 318/609, 318/610, 811, 599, 432, 434
See application file for complete search history.

(56) References Cited

U.S. PATENT DOCUMENTS 5,038,092 A * 8/1991 Asano et al. ................ 318/811
5,155,797 A * 10/1992 Nomura et al. ............. 388/815
5,739,664 A * 4/1998 Deng et al. ................. 318/808
5,747,957 A * 5/1998 Hayashida ................... 318/799
6,809,492 B2 * 10/2004 Harakawa et al. ........... 318/609

FOREIGN PATENT DOCUMENTS

| DE | 29 31 878 A1 | 2/1981 |
| DE | 38 20 125 A1 | 12/1988 |
| EP | 1 229 637 A2 | 8/2002 |

* cited by examiner

*Primary Examiner*—Rina Duda
(74) *Attorney, Agent, or Firm*—Oblon, Spivak, McClelland, Maier & Neustadt, P.C.

(57) ABSTRACT

The present invention relates to a method for limiting the current output by a speed controller (V) for three-phase asynchronous electric motor (M), said controller (V) operating according to a control law (LC) of pure U/F type. Said method is characterized in that it consists in calculating with the aid of a limitation function a correction value for the frequency of the stator (Wstat) then in applying thereto, so as to obtain, in the voltage control law (LC) of U/F type, a corrected frequency of the stator (Wstatc). According to the voltage control law of U/F type, the method thereafter consists on the basis of this corrected frequency of the stator (Wstatc) in obtaining the control voltage (Vqref) applied to the motor. The invention also relates to a system for limiting the current able to implement said method.

5 Claims, 1 Drawing Sheet

METHOD AND SYSTEM FOR LIMITING THE CURRENT OUTPUT BY A SPEED CONTROLLER OPERATING ACCORDING TO A U/F CONTROL LAW

BACKGROUND OF THE INVENTION

1. Field of the Invention

The present invention pertains to a method of limiting the current implemented in a speed controller for three-phase asynchronous electric motor operating according to a control law of U/F type. The present invention also relates to a system for limiting the current that can implement such a method.

A conventional speed controller for asynchronous motor comprises in particular a voltage inverter, for example of PWM (Pulse Width Modulation) type, associated with an uncontrolled rectifier and with a capacitive filter.

2. Description of the Prior Art

It is known that a speed controller associated with an asynchronous motor has a tendency to provide more current to the motor when the motor is subject to an overload. However, in such a situation, the power components of the inverter of the controller may be overly stressed and their lifetime may be affected thereby. It is therefore necessary to limit the current delivered to the motor so as to avoid damaging these power components. Accordingly, in a conventional speed controller operating according to a voltage control law, for example of vector type, use is made of a speed regulator associated with a speed loop and a current regulator associated with a current loop.

Now, in a speed controller operating according to a voltage control law of pure U/F type, no current loop or speed loop is tolerated. Such a speed controller is admittedly less effectual but proves to be much more robust and may in particular be used in products such as transformers or fans.

Patent Application EP 1 229 637 (corresponding to patent U.S. Pat. No. 6,680,599) discloses a system for limiting the current output by a speed controller for asynchronous motor. Such a system is used to limit the current in case of overload in a controller operating according to any voltage control law whatsoever. With reference to FIG. 2 appended, such a system of the prior art operates in the following manner:

A microcontroller circuit Mc01 periodically receives the current signals provided by sensors in the phases of the motor M. These current signals are thereafter processed by a current limitation circuit implementing a current limitation function LIC01. The current limitation function LIC01 determines firstly the modulus of the vector of the phase currents ModI of the motor M, designated hereinbelow modulus of the current vector. It then compares this modulus ModI with a limit current value Ilim stored in the controller V01 and calculates the limitation error. On the basis of this limitation error, the limitation function LIC01 calculates, with the aid of an integral action regulator PI, a control variable. The limitation function LICO1 then multiplies this control variable with the phase currents measured in such a way as to obtain a correction voltage dV for each phase. This correction voltage dV is then deducted from the voltage Vqref calculated according to the control law LCO1 used for the operation of the motor M so as to obtain a corrected reference voltage Vqrefc. Thus, at the output of the speed controller V01, a reference voltage Vqrefc, corrected by virtue of the limitation function LIC01, is applied to the motor M via an inverter PWM.

As represented in FIG. 2, when the voltage control law LC01 used by the speed controller is of U/F type, that is to say with no current loop or speed loop, the voltage Vqref obtained according to the voltage control law of the motor is proportional to the frequency of the stator Wstat in accordance with a determined constant k such that Vqref=k*Wstat and the frequency of the stator Wstat is equal to the frequency reference Wref defined at the input of the speed controller. The constant k represents the magnetic flux created by the magnetizing current flowing through the stator. When a limitation function LIC01 such as that described hereinabove is implemented to limit the current in case of an overload in a speed controller operating according to a voltage control law of U/F type, it provides a correction voltage dV such that the corrected reference voltage Vqrefc calculated, equal to the voltage applied across the terminals of the stator, is equal to k*Wstat−dV. Thus this corrected voltage Vqrefc ensures accurate limitation of the current delivered to the motor M.

Nevertheless, in this case, the voltage equal to Vqrefc which is applied to the terminals of the stator decreases but the frequency of the stator Wstat remains identical. Thus the torque that can be provided by the motor, which is substantially proportional to the U/F ratio, that is to say to Vqrefc/Wstat, also decreases. The torque of the motor during the current limitation is thus less than the torque in the normal situation. DURING a current limitation performed with the aid of a limitation function LIC01 described in application EP 1 229 637, the performance of a motor operating according to a voltage control law of U/F type is diminished and the motor may even stall.

SUMMARY OF THE INVENTION

The aim of the invention is therefore to propose, in a speed controller operating according to a control law of U/F type, a method and a system making it possible to limit the current in the case of an overload while maintaining the performance of the motor.

This aim is achieved by a method for limiting the current output by a speed controller for example for three-phase asynchronous electric motor, said controller comprising an inverter of PWM type whose electronic switches are commanded by a microcontroller circuit and operating according to a control law of U/F type according to which the voltage applied to the terminals of the stator is proportional to the frequency of the stator in accordance with a determined constant, said method being characterized in that it consists in:

- comparing the modulus of the vector of the measured phase currents of the motor with a limit value so as to obtain a limitation error,
- if the modulus of the vector of the phase currents is greater than the limit value, calculating a correction voltage as a function of said limitation error,
- calculating the product of the correction voltage with the inverse of said determined constant,
- subtracting the product thus calculated from the frequency of the stator so as to obtain a corrected frequency of the stator,
- according to the voltage control law of U/F type, calculating the product of the corrected frequency of the stator with said determined constant to obtain the control voltage applied to the terminals of the stator.

According to the invention, a correction is applied directly to the stator frequency obtained and not as in the prior art to the voltage calculated according to the control law. Thus, according to a control law of U/F type, the voltage across the terminals of the stator being proportional to the frequency of the stator, a reduction in the frequency of the stator and a reduction in the voltage are obtained at one and the same time. The limitation of the current is therefore accompanied also by the maintaining of the torque of the motor.

According to a feature, the step of calculating the correction voltage consists in calculating with the aid of a proportional and integral action regulator a control variable and in multiplying this control variable by the phase currents of the motor.

According to another feature, when the modulus of the vector of the phase currents is less than the limit value, the calculated limitation error is applied to the proportional and integral action regulator whose output is clipped to zero.

The aim of the invention is also achieved by a system for limiting the current output by a speed controller for three-phase asynchronous electric motor, said controller comprising an inverter of PWM type whose electronic switches are commanded by a microcontroller circuit operating according to a voltage control law of pure U/F type in which the voltage applied to the terminals of the stator of the motor is proportional to the frequency of the stator in accordance with a determined constant, and in which the reference frequency of the stator imposed at the input is equal to the frequency of the stator, said microcontroller circuit comprising means for calculating, on the basis of the measurements of the phase currents of the motor, the modulus of the vector of these phase currents, for comparing said modulus with a limit value so as to obtain a limitation error and for calculating, as a function of this limitation error, a correction voltage, said system being characterized in that it also comprises means for calculating, when the modulus of the vector of the phase currents is greater than said limit value, a correction value for the frequency of the stator by multiplying said correction voltage by the inverse of said determined constant, for applying this correction value for the frequency of the stator in the voltage control law of U/F type so as to obtain a corrected frequency of the stator, and for calculating the product of the corrected frequency of the stator with said determined constant so as to obtain the control voltage applied to the motor.

According to the invention, in a control law of U/F type, the determined constant represents the magnetic flux created by the magnetizing current flowing through the stator of the motor. This value is calculated previously by computing the quotient of the nominal voltage of the motor over the nominal frequency of the motor and it is stored in the speed controller.

According to a feature, the current limitation system comprises a proportional and integral action regulator able to calculate a control variable and to multiply this control variable by the phase currents of the motor so as to obtain the correction voltage.

BRIEF DESCRIPTION OF THE DRAWINGS

Other features and advantages will appear in the detailed description which follows with reference to an embodiment given by way of example and represented by the appended drawings in which.

DESCRIPTION OF THE PREFERRED EMBODIMENTS

Figure 2:
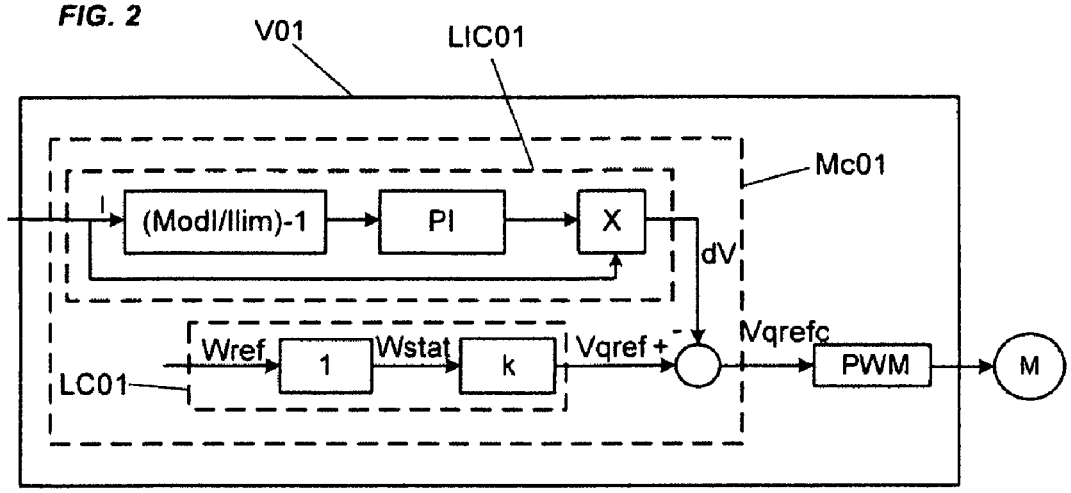
FIG. 2 represents, on the basis of a functional chart, a part of a speed controller for asynchronous motor, equipped with a current limitation system according to the prior art.

FIG. 2 which illustrates the operation of a current limitation system according to the prior art has been described previously.

Figure 1:
FIG. 1 illustrates, on the basis of a functional diagram, the operation of a control law of pure U/F type.

FIG. 1 represents, on the basis of a functional diagram, the principle of operation of a voltage control law of pure U/F type that can be used in a speed controller to control an asynchronous motor. According to this control law, no current loop is used. Thus, according to this control law, the reference frequency Wref imposed at the input to a speed controller is always equal to the frequency of the stator Wstat and corresponds directly to a reference voltage Vqref which will be applied via an inverter to an asynchronous motor. This voltage vqref is directly proportional to the frequency of the stator so that Vqref=k*Wstat.

Thus, as may be seen in FIG. 1, in contradistinction to conventional speed controllers in which it is possible to limit the currents in the case of an overload by using current and speed loops, in a voltage control law of U/F type, no loop is used.

Figure 3:
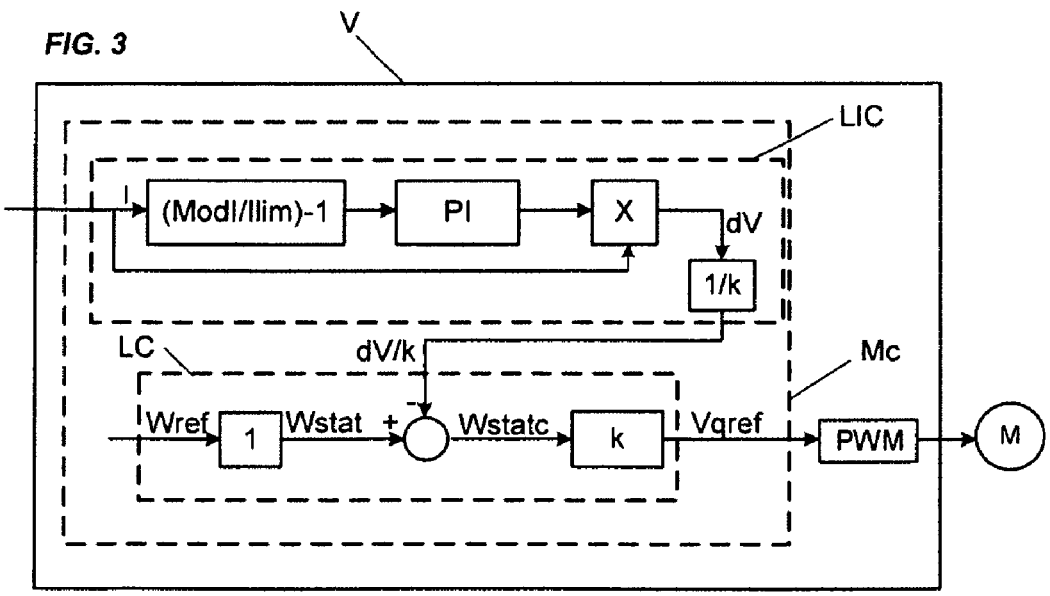
FIG. 3 represents, on the basis of a functional chart, a part of a speed controller for asynchronous motor, equipped with a current limitation system according to the invention.

Referring to FIG. 3, a speed controller V of a three-phase asynchronous motor M comprises in particular a customary voltage inverter controlled by pulse width modulation termed a PWM inverter. Such a PWM inverter delivers to the motor M a string of pulses of fixed amplitude, positive or negative, modulated in width, according to a voltage control law. The electronic switches of the inverter are commanded by a drive circuit comprising in particular a microcontroller Mc.

The microcontroller Mc periodically receives the current signals I provided by sensors in the phases of the motor. These currents are processed by a current limitation circuit implementing a current limitation function LIC (FIG. 3).

According to the invention, a current limitation function LIC determines firstly the modulus of the current vector ModI, by calculating the square root of the sum of the squares of each phase current. Thereafter, as represented in FIG. 3, the limitation function LIC compares the modulus of the current vector ModI with a limit value Ilim stored in the speed controller V. This limit value Ilim corresponds to the value of current not to be exceeded in the case of an overload. This comparison is carried out by deducting the value 1 from the quotient between the modulus of the current vector ModI and the limit value Ilim.

Thus if the modulus of the current vector ModI is less than Ilim, the calculation returns a negative result. This result is applied to a proportional and integral action regulator PI whose negative output is clipped to zero. Thus if the modulus of the current vector ModI is less than the limit value Ilim, nothing will disturb the implementation of the control law LC of U/F type.

If the modulus of the current vector ModI is greater than Ilim, the calculation returns a positive result. In this case, the proportional and integral action regulator PI calculates a control variable. The limitation function LIC then multiplies this control variable with the phase currents so as to deliver a correction voltage dV for each phase.

According to the invention, the limitation function LIC then multiplies this correction voltage dv by the inverse of a constant dubbed k. This constant k corresponds to the nominal magnetic flux created by the magnetizing current flowing through the stator of the motor. It is equal to the quotient between the nominal voltage of the motor and the nominal frequency of the motor and is stored in the speed controller V.

According to the voltage control law LC of U/F type, the reference frequency Wref imposed at the input of the controller V is equal to the frequency of the stator Wstat. The correction dV/k calculated with the aid of the current limitation function LIC is then applied directly to the frequency of the stator Wstat in the voltage control law LC so as to obtain a corrected frequency of the stator Wstatc equal to Wstat−dV/k. According to the voltage control law LC of U/F type, the voltage Vqref is then calculated. By definition this voltage is equal to the product of the frequency of the stator and of the constant k. Here, the frequency of the stator corresponds to the corrected frequency of the stator Wstatc. This voltage Vqref is therefore equal to k*Wstatc, i.e. to k*(Wstat−dV/k). At the output of the speed controller a voltage equal to the voltage Vqref calculated is applied across the terminals of the stator of the motor M.

Thus, according to the invention, in a control law of U/F type, by applying the correction directly to the frequency of the stator Wstat, a limitation of the current and the maintaining of the torque of the motor M are obtained at one and the same time since the voltage Vqref is always equal to k*Wstat−dv and since the frequency of the stator is decreased. The U/F control law is therefore complied with perfectly.

It is well understood that, without departing from the scope of the invention, it is possible to contemplate other variants and refinements of detail and even to envisage the employing of equivalent means.

The invention claimed is:

1. Method for limiting the current output by a speed controller (V) for electric motor (M), said controller (V) comprising an inverter of PWM type whose electronic switches are commanded by a microcontroller circuit (Mc) and operating according to a control law (LC) of U/F type according to which the voltage (Vqref) applied to the terminals of the stator is proportional to the frequency of the stator (Wstat) in accordance with a determined constant (k), said method being characterized in that it consists in:

comparing the modulus of the vector of the measured phase currents (ModI) of the motor (M) with a limit value (Ilim) so as to obtain a limitation error, if the modulus of the vector of the phase currents (ModI) is greater than the limit value (Ilim), calculating a correction voltage (dV) as a function of said limitation error, calculating the product of the correction voltage (dV) with the inverse of said determined constant (k), subtracting the product thus calculated from the frequency of the stator (Wstat) so as to obtain a corrected frequency of the stator (Wstatc), according to the voltage control law (LC) of U/F type, calculating the product of the corrected frequency of the stator (Wstatc) with said determined constant (k) to obtain the control voltage (Vqref) applied to the motor (M).

2. Method according to claim 1, characterized in that the step of calculating the correction voltage (dV) consists in calculating with the aid of a proportional and integral action regulator (PI) a control variable and in multiplying this control variable by the phase currents of the motor (M).

3. Method according to claim 2, characterized in that when the modulus of the vector of the phase currents (ModI) is less than the limit value (Ilim), the calculated limitation error is applied to the proportional and integral action regulator (PI) whose output is clipped to zero.

4. System for limiting the current output by a speed controller for three-phase asynchronous electric motor (M), said controller (V) comprising an inverter of PWM type whose electronic switches are commanded by a microcontroller circuit (Mc) operating according to a voltage control law (LC) of pure U/F type in which the voltage (Vqref) applied to the terminals of the stator of the motor is proportional to the frequency of the stator (Wstat) in accordance with a determined constant (k), said system being characterized in that it comprises means (LIC) for:

comparing, on the basis of the measurements of the phase currents of the motor (M), the modulus of the vector of these phase currents (ModI) with a limit value (Ilim) so as to obtain a limitation error, calculating, as a function of this limitation error, a correction voltage (dV), calculating, when the modulus of the vector of the phase currents (ModI) is greater than said limit value (Ilim), a correction value for the frequency of the stator (Wstat) by multiplying said correction voltage (dv) by the inverse of said determined constant (k), applying this correction value for the frequency of the stator (Wstat) in the voltage control law (LC) of U/F type so as to obtain a corrected frequency of the stator (Wstatc), calculating the product of the corrected frequency of the stator (Wstatc) with said determined constant (k) so as to obtain the control voltage (Vqref) applied to the motor (M).

5. System according to claim 4, characterized in that it comprises a proportional and integral action regulator (PI) able to calculate a control variable and to multiply this control variable by the phase currents of the motor so as to obtain the correction voltage (dV).

* * * * *